United States Patent [19]

Rokunohe et al.

[11] Patent Number: 4,549,175

[45] Date of Patent: Oct. 22, 1985

[54] IMAGE TRANSMISSION APPARATUS USING A RANDOM ARRANGEMENT OF OPTICAL FIBERS

[75] Inventors: Mitsuru Rokunohe; Toshiyuki Nakajima, both of Amagasaki; Kansei Iwata, Tama; Hiroyuki Tajima, Fuchu, all of Japan

[73] Assignees: Dainichi-Nippon Cables, Ltd., Hyogo; Graphica Computer Corporation, Tokyo, both of Japan

[21] Appl. No.: 433,193

[22] Filed: Oct. 6, 1982

[51] Int. Cl.[4] ............................................. G09G 1/00
[52] U.S. Cl. .............................. 340/794; 340/815.31; 340/750; 358/250; 358/123; 358/259; 382/68
[58] Field of Search ............... 340/794, 795, 796, 797, 340/815.31, 703, 750, 798; 358/250, 259, 93, 94, 98, 100, 119, 123; 455/612, 600; 382/68

[56] References Cited

U.S. PATENT DOCUMENTS

| 3,612,843 | 10/1971 | Aptroot-Soloway | 340/815.31 |
| 4,023,165 | 5/1977 | Holt et al. | 340/728 |
| 4,032,970 | 6/1977 | Anderson | 358/250 |
| 4,070,693 | 1/1978 | Shutterly | 358/123 |
| 4,240,073 | 12/1980 | Seats et al. | 340/703 |

OTHER PUBLICATIONS

*Light For the Blind;* Newsweek, Feb. 11, 1974; p. 48.

Primary Examiner—Marshall M. Curtis
Attorney, Agent, or Firm—Pollock, Vande Sande and Priddy

[57] ABSTRACT

Image display apparatus provided with an address converter aiding the apparatus in faithfully reproducing for display an optical image transmitted via an optical fiber bundle. The address converter is adapted to store information concerning the relation between the geometric address of the individual optical fibers at one end face of the optical fiber bundle and that at the other end face so as to permit conversion of one geometric address to the other. The small elements of an image transmitted through the individual optical fibers to the rear end of the bundle are rearranged in accordance with the geometric address of the fibers on the front end to complete an image conforming to the original transmitted image.

7 Claims, 12 Drawing Figures

IMAGE TRANSMISSION APPARATUS USING A RANDOM ARRANGEMENT OF OPTICAL FIBERS

BACKGROUND OF THE INVENTION

1. Field of the Invention

This invention relates to a display apparatus for displaying an optical image transmitted via a cable taking the form of an optical fiber bundle.

2. Description of the Prior Art

It is known to use a cable comprising an optical fiber bundle, obtained by bundling a plurality of optical fibers, to transmit an optical image from one end of the bundle to the other by projecting the optical image with the aid of a lens, for example, on the front end face of the bundle and allowing the image to be transferred through the bundle and formed in the rear end face of the bundle.

For successful transmission of the optical image, however, the optical fiber bundle is required to be such that, at the opposite ends thereof, the individual optical fibers thereof are disposed geometrically in mutually corresponding positions. Otherwise, no faithful transmission of the optical image is obtained because the optical image in the front end face of the bundle and the optical image in the rear end face do not coincide with each other.

In the production of an optical fiber bundle of great length, the practice of imparting flexibility to the bundle, for example, by intertwisting individual optical fibers or strands of optical fibers so as to facilitate the handling of the bundle when the bundle is wound on a drum has found widespread acceptance. When the individual optical fibers are intertwisted or otherwise manipulated, however, there inevitably ensues the consequence that the geometric positions of the individual optical fibers relative to one another differ in the opposite end faces of the bundle. Such an arrangement of fibers, wherein the relative geometric positions of the fibers differ at the opposite end faces of a fiber bundle, will hereinafter be referred to as a "random" arrangement of fibers. Moreover, when the number of optical fibers making up an optical fiber bundle is increased in an attempt to improve the definition of an optical image to be transmitted, it often happens that optical fibers having flaws, such as chippings and fractures which are responsible for blots appearing in the displayed image, may possibly mingle with other flawless optical fibers in the bundle.

In conventional optical image transmission, therefore, because of the foregoing problems only a rather slender optical fiber bundle of small length is customarily used for medical observation of internal organs such as the stomach and the esophagus as a fiberscope (such as a gastroscope).

There is eager demand for application of the optical image transmission technique to remote monitoring of important phenomena occurring at places such as the interiors of nuclear reactors and blast furnaces which are hardly accessible by human beings. This demand is not easily met at present, in actuality, because manufacture of a long optical fiber bundle having as many optical fibers as desired and yet warranting perfect mutual conformity of the geometric positions of individual optical fibers in the opposite end faces of the bundle is extremely difficult for the reason given above.

SUMMARY OF THE INVENTION

An object of this invention is to provide an optical image display apparatus, which, even when used with an optical fiber bundle having a random arrangement of fibers, i.e., the geometric positions of individual optical fibers thereof are not mutually conforming in the opposite end faces, enables an optical image which has been projected on the front end face and transferred to the rear end face to be displayed faithfully to the original optical image.

Another object of this invention is to provide an optical image display apparatus for displaying an optical image transmitted via an optical fiber bundle, which apparatus, when used with an optical fiber bundle containing, in the optical fibers making up the bundle, those sustaining chippings or fractures, compensates for those elements of optical information which ought to have been conveyed by those defective optical fibers and eliminates otherwise possible blots from the displayed optical image.

Still another object of this invention is to provide an optical image display apparatus provided with a readily manufacturable address converter capable of converting the geometric addresses of individual optical fibers making up an optical fiber bundle in one end face of the bundle into the geometric addresses thereof in the other end face.

A further object of this invention is to provide an optical image display apparatus which is adapted to receive the information of an optical image transmitted through an optical fiber bundle, store the information temporarily in a memory, read the information repeatedly out of the memory, and put it on a CRT display as a visible image.

Another further object of this invention is to provide an optical image display apparatus for displaying an optical image transmitted via an optical fiber bundle, which apparatus can be used for the remote monitoring of phenomena occurring at places hardly accessible by human beings.

DETAILED DESCRIPTION OF THE INVENTION

Figure 1:
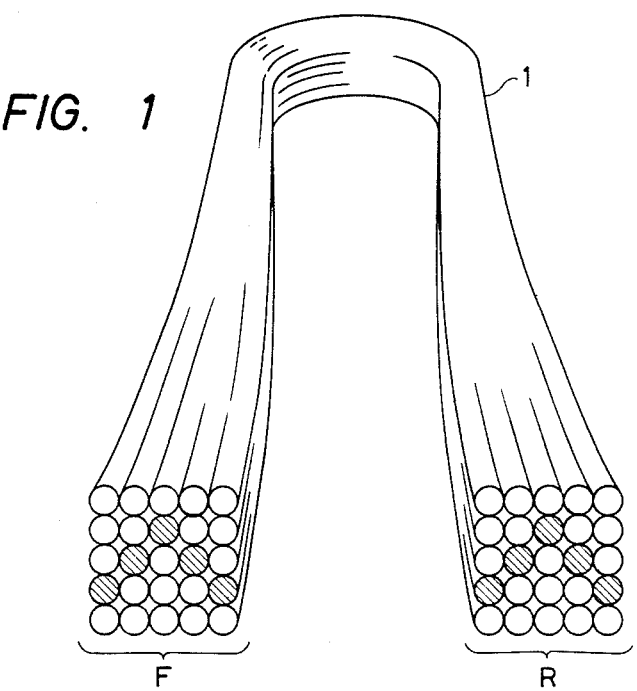
FIG. 1 is a schematic diagram illustrating a conventional optical fiber bundle for transmission of an optical image.

Now, one embodiment of this invention will be described in detail below with reference to the accompanying drawings. FIG. 1 is a schematic diagram illustrating a conventional optical fiber bundle for transmission of an optical image. In the diagram, 1 denotes an optical fiber bundle, F a front end of the optical fiber bundle, and R a rear end thereof. The bundle 1 comprises individual optical fibers which, at the front end F and the rear end R, are disposed geometrically in mutually corresponding positions in the respective end faces. Transmission of an optical image by this bundle 1 is effected by projecting the optical image with the aid of a lens (not shown), for example, on the face of the front end F, whereby the small elements of the optical image impinging upon the optical fibers are conducted through the optical fibers to form a corresponding optical image in the face of the rear end R.

Figure 2:
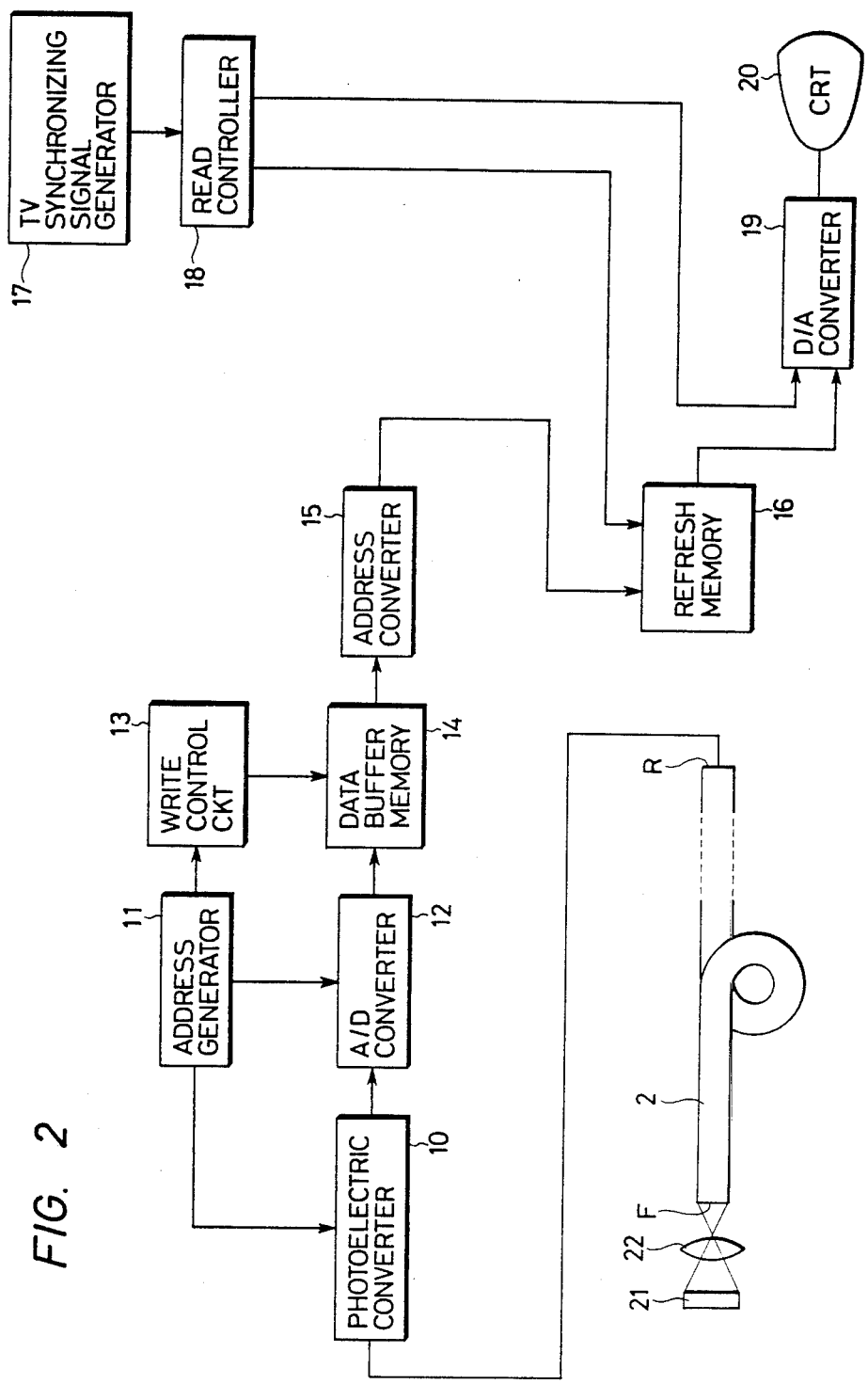
FIG. 2 and FIG. 9 are block diagrams each illustrating an embodiment of this invention.

FIG. 2 is a block diagram illustrating one embodiment of the invention. In this diagram, 21 denotes an object to be monitored, 22 a lens, and 2 a long flexible optical fiber bundle. By 10 is denoted a photoelectric converter, which is actually a color TV camera consisting of a pickup tube and a control unit and which converts an optical image of the object 21 transmitted by the optical fiber bundle 2 to the rear end face R into analog electric signals R (red), G (green), and B (blue). An A/D converter 12 serves to convert the analog RGB electric signals from the photoelectric converter 10 into corresponding RGB signals in 64 levels (6 bits) of shade for each picture element (dot) of one scene which may be formed of 512×512 dots, for example. This A/D conversion proceeds at super-speed in the order of the 2-D (dimensional) addresses which are generated by a 2-D address generator 11.

The 2-D address generator 11 serves to generate 2-D addresses (X address and Y address) of each of the picture elements (dots) when the photoelectric conversion plane in the converter 10 is equally divided into 512×512 dots. These 2-D addresses are generated so that the displayed scene may be correctly scanned. A write control circuit 13 serves to store in a data buffer memory 14 the picture element information (RGB signals and corresponding information on shade) which has been digitalized for each picture element in the A/D converter 12.

An address converter 15 is provided which includes memory means taking the form of a conversion table prepared in advance to fulfil the work of converting the addresses of the positions of the individual optical fibers of the optical fiber bundle in the face of the rear end R into the addresses of the positions of the same optical fibers in the face of the front end F. The method for preparing this address conversion table will be described with reference to FIG. 3 and FIG. 4.

Figure 3:
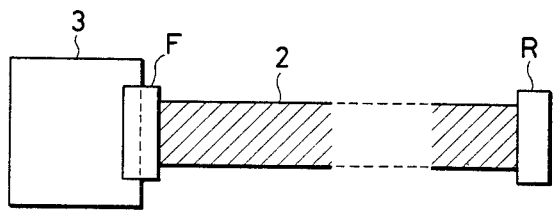
FIG. 3 is a schematic diagram of a device for producing an address converter to be used in the present invention.

FIG. 3 is a schematic diagram of a device for producing the address converter and FIGS. 4(a) and 4(b) are schematic diagrams illustrating the operation of the device. In FIG. 3, 2 denotes a long flexible optical fiber bundle, which is provided at the front end F thereof with a simulator 3.

The simulator 3 functions to emit light and moves it along the face of the front end F of the optical fiber bundle from one side to the other, so that the light enters the individual optical fibers.

Figure 4:
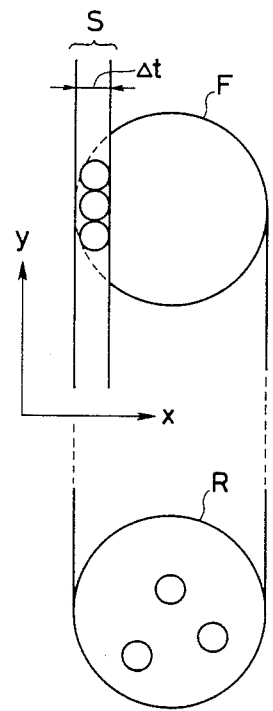
FIGS. 4(a), 4(b) and 4(c) are schematic diagrams illustrating a procedure for the operation of the device of FIG. 3.
Figure 4:
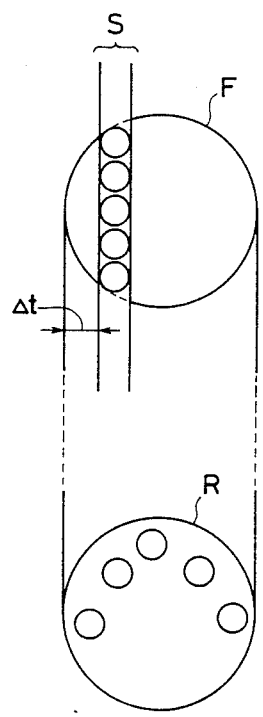
Figure 4:
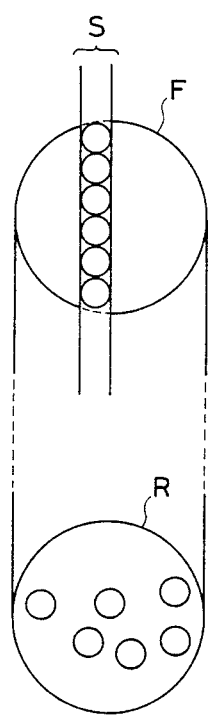

In FIG. 4, S denotes a luminescent line of a width $\Delta t$ (nearly equal to or smaller than the cross-sectional diameter of one optical fiber) associated with an optical fiber bundle having a random fiber arrangement whose front end is designated F and whose rear end is designated R. The luminescent line S is generated by the simulator 3.

In FIG. 4(a), the luminescent line S parallel to the y axis is positioned at the leftmost side of the front end F to deliver light to three optical fibers. At this time, light is emitted by the corresponding three optical fibers at the rear end R. Thus, the addresses of the positions of these three optical fibers are put into a memory, i.e., the address conversion table in address converter 15. Then, as shown in FIG. 4(b), the luminescent line S is shifted by a predetermined minute interval $\Delta t$ in the direction of the x axis to deliver light, this time, to five optical fibers. Similarly to the former instant, light is emitted by the corresponding five optical fibers at the rear end R. The addresses of the positions of these five optical fibers are put into the memory, i.e., the address conversion table. In the same manner, the luminescent line S is successively shifted by equal intervals in the direction of the x axis, to scan the front end F.

Then, the luminescent line S is laid down and shifted successively by minute intervals $\Delta t$ in the direction of the y axis parallelly to the x axis, with the addresses of the positions of optical fibers showing light on the rear end R at the successive shifts of the luminescent line S being put into the address conversion table in address converter 15. After the two scannings of the front end F by the luminescent line S one each in the directions of the x axis and the y axis, all the addresses of the locations of light-showing optical fibers on the rear end R are consolidated to find the relationship between the addresses of the positions of optical fibers on the front end F and those on the rear end R.

Of course, the light emitted from the simulator 3 need not be a visible light but may be an invisible light. The effect produced by successively shifting the luminescent line S as described above may be equally brought about by gradually expanding the illuminated area of the front end F of the bundle.

The aforementioned determination of the relationship between the addresses of the positions of optical fibers on the front end F and those on the rear end R depending on the results of the two scannings will be described more specifically below with reference to FIG. 5. FIG. 5 is a model diagram illustrating the addresses of the positions of the individual optical fibers of the optical fiber bundle on the front end F and the rear end R; the addresses on the front end F are shown in FIG. 5(a) and those on the rear end R in FIG. 5(b) respectively.

Figure 5A:
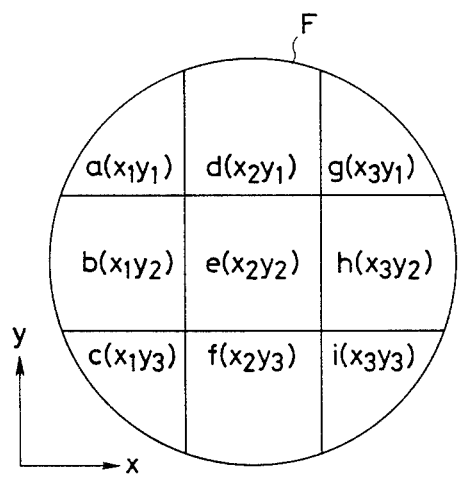
FIGS. 5(a) and 5(b) are model diagrams illustrating the addresses of the positions of individual optical fibers of an optical fiber bundle in one end face of the bundle and the addresses of the positions of the same individual optical fibers in the other end face.
Figure 5B:
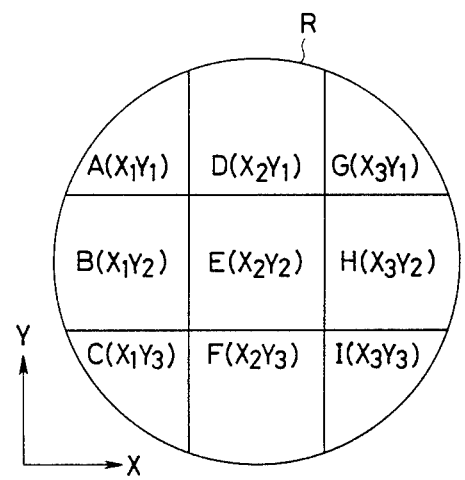

For better comprehension, it is assumed that in FIG. 5(a), the front end F of the optical fiber bundle comprises a total of nine optical fibers shown by letters "a" through "i" and that, as shown in FIG. 5(b), the positions of optical fibers showing on the rear end R are denoted by the letters "A" through "I".

The luminescent line being parallel to the y axis is to be shifted to scan the front end F first in the direction of the x axis.

In the first stage, it is assumed that light show in the fiber positions G, E, and C on the rear end R when light of the luminescent line enters the fiber positions a (x1, y1), b (x1, y2), and c (x1, y3) on the front end F. Then it is known that G, E, and C severally have the address x1 at least on the front end F side because a, b, and c share the address x1 in common.

In the second stage, if light shows in the fiber positions A, H, and F on the rear end R when light of the luminescent line enters the fiber positions d (x2, y1), e (x2, y2), and f (x2, y3) on the front end F, then it is known that A, H, and F share the address x2 in common at least on the front end F side.

In the third stage, if light shows in the fiber positions B, D, and I on the rear end R when light of the luminescent line enters the fiber positions g (x3, y1), h (x3, y2), and i (x3, y3) on the front end F, then it is known that B, D, and I share the address x3 in common at least on the front end F side.

Now, the luminescent line being parallel to the x axis is laid down and shifted to scan the front end F downwardly from the upper side in the direction of the y axis.

In the fourth stage, it is assumed that light shows in the fiber positions E, F, and B on the rear end R when light of the luminescent line enters the fiber positions a (x1, y1), d (x2, y1), and g (x3, y1). Then it is known that E, F, and B share the address y1 in common at least on the front end F side.

In the fifth stage, if light shows in the fiber positions A, G, and I on the rear end R when light of the luminescent line enters the fiber positions b (x1, y2), e (x2, y2), and h (x3, y2) on the front end F, it is known that these fiber positions A, G, and I share the address y2 in common at least on the front end F side.

In the sixth stage, if light shows in the fiber positions C, D, and H on the rear end R when light of the luminescent line enters the fiber positions c (x1, y3), f (x2, y3) and i (x3, y3) on the front end F, it is known that these fiber positions C, D, and H share the address y3 in common at least on the front end F side.

Consolidation of the foregoing results ascertains that there exists the following relationship between the positions of the individual optical fibers on the rear end R and the front end R.

A(X1, Y1)→e(x2, y2)

B(X1, Y2)→g(x3, y1)

C(X1, Y3)→c(x1, y3)

D(X2, Y1)→i(x3, y3)

E(X2, Y2)→a(x1, y1)

F(X2, Y3)→d(x2, y1)

G(X3, Y1)→b(x1, y2)

H(X3, Y2)→f(x2, y3)

I(X3, Y3)→h(x3, y2)

The address converter 15 in FIG. 2 is obtained by tabulating the relationship between the positions of the individual optical fibers on the front end F and the rear end R which has been ascertained as described above. By the use of this address converter 15, on the rear end R of the optical fiber bundle, the information obtained at the fiber position A is stored in the address (x2, y2) of the address conversion table, the information obtained at B is stored in the address (x3, y1) of the said table, and this procedure is repeated thereafter until the information obtained at I is stored in the address (x3, y2) of the table. Then, by reading out the memorized information in the order of the addresses, the optical image formed on the front end F is faithfully reproduced on the display.

Now, in FIG. 2, a further memory 16 which may be a refresh memory is a circuit for memorizing, in the order of scanning addresses, the information which has undergone address conversion in the address converter 15. A TV synchronizing signal generator 17 is a circuit for generating horizontal and vertical synchronizing signals when raster scanning is made on a CRT (cathode ray tube) 20. A read controller 18 is a circuit for reading out the information written in a refresh memory 16 and delivering it to a D/A converter 19 by keeping pace with the TV synchronizing signals from the circuit 17. The D/A converter 19 is a circuit for converting a train of digital picture-element signals brought in from the refresh memory 16 into color video signals and delivering the produced color video signals to the CRT 20.

Although the operation may be already apparent from the foregoing description, it will be described briefly below. The image of an object 21 to be monitored which is situated in a position such as the interior of a nuclear reactor which is not accessible by human beings is formed in the face of the front end F of the optical fiber bundle 2 with the aid of a lens 22, for example. The optical image is transmitted through the optical fiber bundle 2 to the photoelectric converter 10, there to be converted into electric signals under the control of the address generator 11. The electric signals are then converted into digital signals at the A/D converter 12. The digital signals are subsequently written in the data buffer memory 14 under the control of the write controller 13. In the address converter 15, the information which has been read out of the data buffer memory by read control means which is not shown in the diagram undergoes address conversion in accordance with the relationship found in advance between the positions of the individual optical fibers on the front end F and the rear end R of the optical fiber bundle 2 and then written in the refresh memory 16. The read controller 18 reads out the information from the refresh memory 16 under the control of the TV synchronizing signal generator 17. The information is converted into analog signals in the D/A converter 19. The analog signals are delivered to be displayed on the CRT 20. Consequently, the optical image of the object 21 under surveillance is displayed on the CRT 20 and watched.

Figure 6:
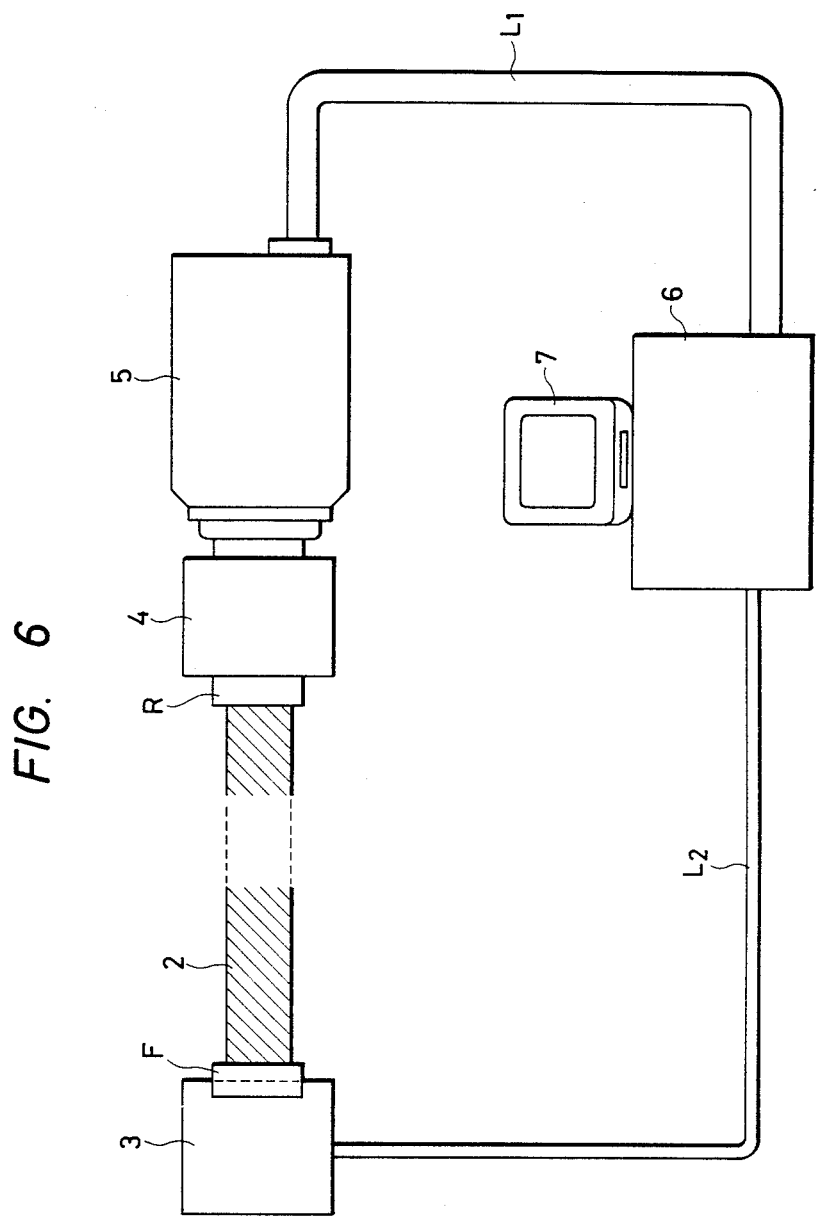
FIG. 6 is a front view illustrating in detail the device for producing the address converter to be used in the present invention.

FIG. 6 is a front view illustrating in detail the device to be used for producing the address converter illustrated in FIG. 3. In this diagram, 4 denotes an adapter, 5 an image pickup device, 6 a controller, and 7 a monitor device.

To the front end F of a long flexible optical fiber bundle 2 is attached the simulator 3. The image pickup device 5 is attached to the rear end R of the bundle through the medium of the adapter 4. The image pickup device 5 and the controller 6 are interconnected with a line L1. Further, the controller 6 is connected through a control line L2 to the simulator 3. The controller 6 forwards control signals through the control line L2 to the simulator 3 to generate a luminescent line and cause the luminescent line to scan the front end F of the optical fiber bundle 2.

At this time, the positions of light-showing optical fibers on the rear end R of the bundle 2 are picked up by the image pickup device 5. The addresses of these positions are supplied to the controller 6. At the controller 6, the address conversion table of the positions of the individual optical fibers of the optical fiber bundle 2 on the front end F and the rear end R is produced on the basis of the received data of addresses in the manner as described above. The monitor device 7 is a cathode ray tube display (CRT display) to be used for the purpose of monitoring.

Figure 7:
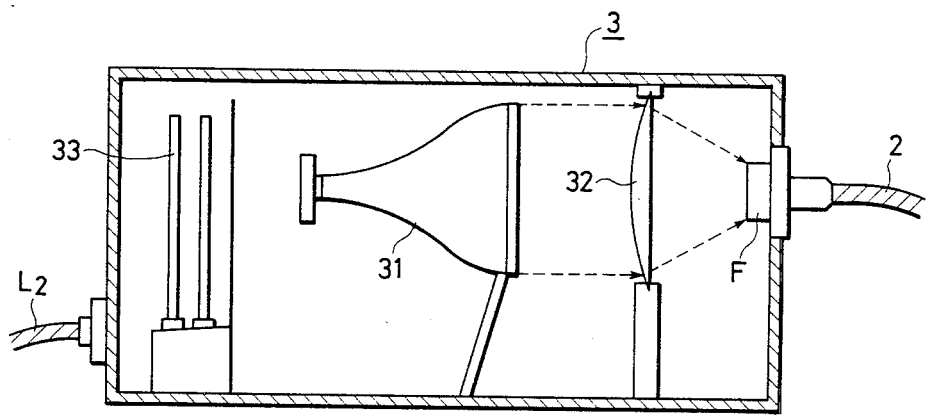
FIG. 7 is a cross section of a simulator 3 in the device of FIG. 6, illustrating the inner structure thereof.
Figure 8:
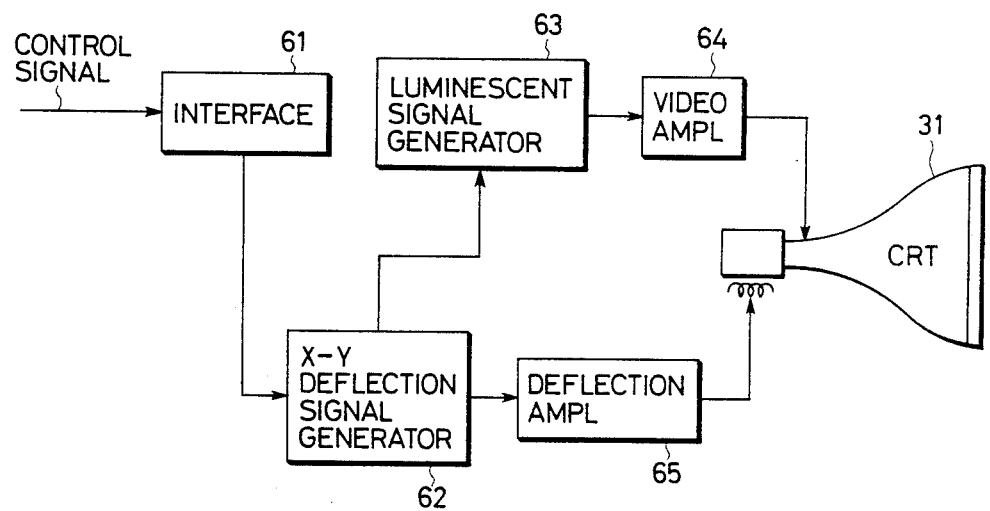
FIG. 8 is a block diagram illustrating an electrical circuit in the simulator 3 of the device of FIG. 6.

FIG. 7 is a sectional diagram illustrating the inner structure of the simulator 3 and FIG. 8 is a block diagram illustrating the electric circuit of the simulator 3.

Reference is now made to FIG. 7. A CRT (cathode ray tube) 31 is used for the generation of a luminescent line. This luminescent line is focussed by a lens 32 on the face of the front end F of the optical fiber bundle 2. By 33 is denoted a printed-circuit board containing necessary electric circuits.

Now with reference to FIG. 8, 61 denotes an interface, 62 an X-Y deflection signal generator, 63 a luminescent signal generator, 64 a video amplifier, and 65 a deflection amplifier.

The control signal issued from the controller (6 in the diagram of FIG. 6) is delivered via the interface 61 to the X-Y deflection signal generator 62. In response thereof, the generator 62 issues X and Y deflection signals for the luminescent line and directs this signal toward the deflection amplifier 65. Simultaneously, the luminescent signal generator 63 issues a luminescent signal, which is amplified by the video amplifier 64 and applied to the electrode of the CRT 31. On the other hand, the output from the deflection amplifier 65 is applied to the deflection coil of the CRT 31. The generation of the luminescent line and the scanning with this luminescent line in the CRT 31 are readily materialized by the prior art as described above.

In the embodiment of this invention illustrated in FIG. 2, the optical fiber bundle 2 has large length. If any of the optical fibers in this bundle sustains a fracture somewhere along its length, that particular optical fiber appears as a blot in the reproduced optical image and impairs the quality of the displayed image. The optical fiber bundle 2 generally may be produced by first preparing unit strands each consisting of a plurality of optical fibers, then intertwisting a plurality of such unit strands, and then if necessary, subjecting the resultant bundle to drawing. When the optical image is observed at one end of the optical fiber bundle, the fibers of the peripheral region of each unit strand suffers loss because of residual strain in intertwisting or drawing and shows dark shade. This phenomenon impairs the definition of the picture image.

Another embodiment of this invention offers a solution to this problem. This embodiment will be described below with reference to FIG. 9.

Figure 9:
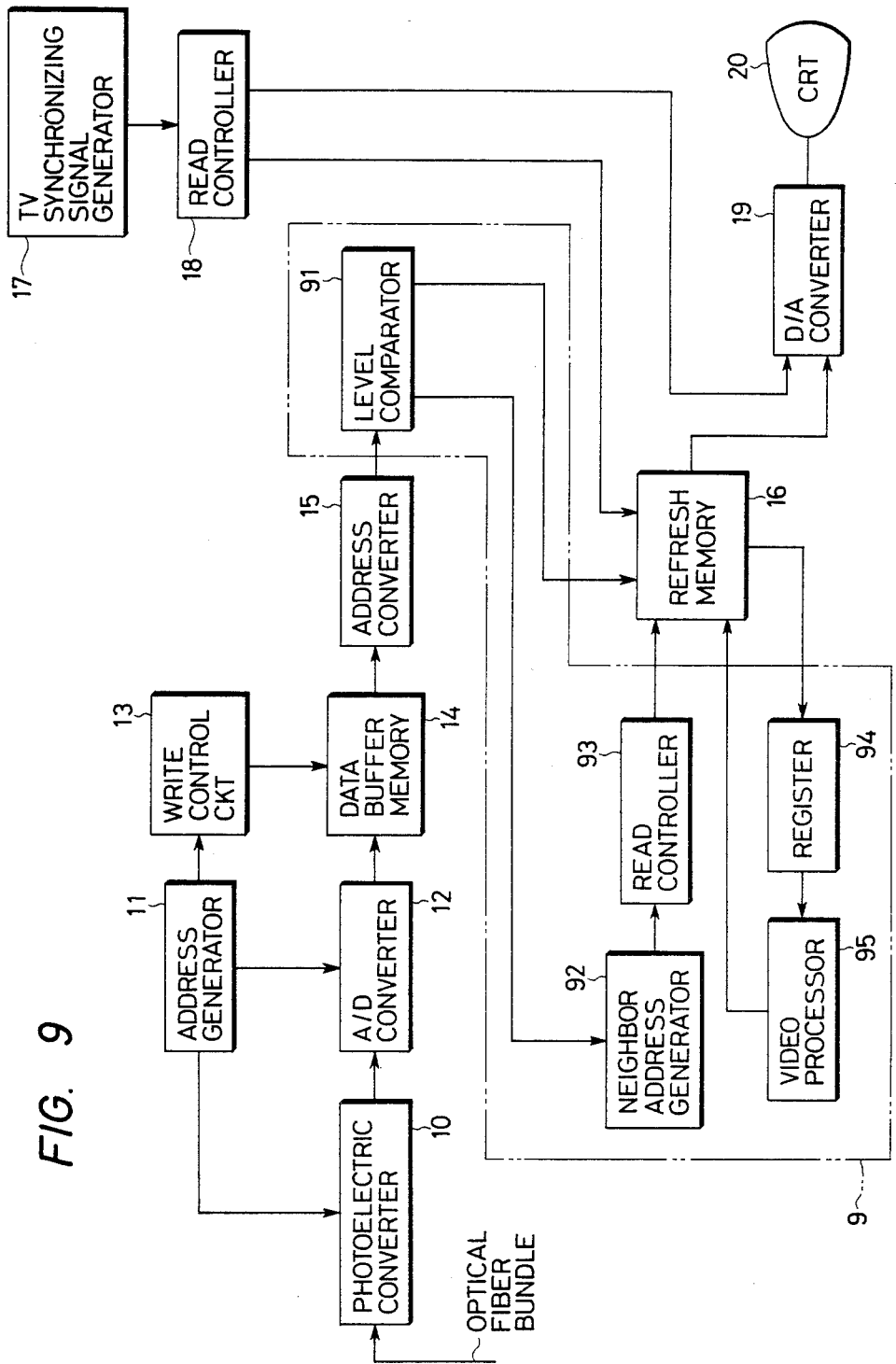

FIG. 9 is a block diagram illustrating the embodiment of this invention just mentioned. The circuit configuration of this diagram differs from that of FIG. 2 in respect that it additionally incorporates the group of circuits 9 enclosed with a chain line. In other words, the addition of the group of circuits 9 to the circuit configuration of FIG. 2 completes the circuit configuration of FIG. 9. This group 9 consists of a level comparator 91, a neighbor address generator 92, a read controller 93, a video processor 95, and a data register 94.

In FIG. 9, the level comparator 91 is a circuit for rating the level of the data which have undergone address conversion in the address converter 15. It writes the data in the refresh memory 16 when it has found the level of the data is predetermined standard range of level. When the level is not found to be within the stated range, that is, the data is defective, the level comparator 91 conveys the address of the data to the neighbor address generator 92. In response, the neighbor address generator 92 issues addresses of the data points surrounding the address received from the level comparator 91. Based on the addresses given by the generator 92, the read controller 93 reads out from the refresh memory 16, the data at the data points (4 points, for example) surrounding the defective data point of insufficient level and stores the read-out data in the register 94. In the video processor 95, the average value (not necessarily average), for example, of the data at the four points stored in the data register 94 is determined by calculation. This value is written in the address of the defective data point in the refresh memory 16.

If the defective data point happens to be on the zero level due to a fracture in one of the optical fibers making up the optical fiber bundle, the defective data are corrected by the data of the neighbor data points on condition that the data of the neighbor data points are normal. In this manner, the present embodiment of this invention is capable of improving the quality of the picture image. The dark shade in the peripheral region of each unit strand is corrected in entirely the same manner.

What is claimed is:

1. An image transmission apparatus, comprising an optical fiber bundle consisting of a number of randomly arranged optical fibers for transmitting an optical image formed on the front end face thereof to the rear end face thereof, photoelectric conversion means for dividing the optical image formed on said rear end face of said bundle into elements of light information assigned to the addresses of the geometric positions of individual optical fibers of said optical fiber bundle in said rear end face and converting said elements of light information into electric signals, first memory means for storing the relationship between the addresses of the geometric positions of said individual optical fibers in the front end face of said optical fiber bundle and the addresses of geometric positions of said individual optical fibers in the rear end face of said bundle, means for rearranging the electric signals supplied from said photoelectric conversion means in correspondence with said addresses of positions of said individual optical fibers in the rear end face of said optical fiber bundle, said rearranging means including second memory means for storing said electric signals at addresses read out of said first memory means corresponding to the addresses of the geometric positions of the individual optical fibers in said rear end face of said optical fiber bundle, and a display device for displaying two-dimensionally the rearranged electric signals read out of said second memory means thereby to reproduce the optical image formed in said front end face of said optical fiber bundle.

2. An image transmission apparatus according to claim 1 which further comprises comparator means for rating the magnitude of said rearranged electric signals, means for storing as data in said second memory means only those electric signals found by said comparator means to possess at least a specified magnitude, means responsive to detection by said comparator means of a defective electric signal not possessing said specified magnitude for reading out data stored at addresses in said second memory means corresponding to the addresses of positions surrounding the address at which said defective electric signal ought to have appeared on said display device, means for performing a predetermined processing on said data, and means for writing into said second memory means the data resulting from said processing as data representing said defective electric signal.

3. An image transmission apparatus according to claim 2, wherein said predetermined processing is an arithmetic operation for finding an average value of said data.

4. An image transmission apparatus according to any one of claims 1, 2 or 3, wherein said second memory is a refresh memory.

5. An image transmission apparatus according to claim 1 wherein said first memory means is a look up table which stores in tabular form the relationship between the addresses of the positions of individual optical fibers on one end of the optical fiber bundle and the addresses of the positions of said optical fibers on the other end, and means for storing said relationship in said table comprising means for scanning one end face of said optical fiber bundle with light to inject light into corresponding optical fibers, and means for detecting the positions of optical fibers showing light in the other end face during said scanning.

6. An image transmission apparatus according to claim 1 wherein said first memory means is a look up table which stores in tabular form the relationship between the addresses of positions of individual optical fibers on one end of said optical fiber bundle and the addresses of positions of said optical fibers on the other end, and means for storing said relationship in said table comprising means for injecting light simultaneously into the end faces of all the optical fibers sharing in common each of the x addresses in an x-y two-dimensional address coordinates plane formed on one end face of said optical fiber bundle, means for memorizing upon each such injection of light the addresses of positions of the optical fibers showing light in a two-dimensional address coordinates plane formed at the other end face of said optical fiber bundle, means for causing said light injecting means to again inject light simultaneously into the end faces of all the fibers sharing in common each of the y addresses in said x-y two-dimensional address coordinates plane, said memorizing means being operative upon each such further injection of light to memorize the addresses of positions of the optical fibers showing light in the two-dimensional address coordinates plane formed at the other end face of said optical fiber bundle, and means for consolidating the results of said first and second memorization.

7. An image transmission apparatus according to claim 5, wherein the light used for scanning said front end face of said optical fiber bundle is invisible light.

* * * * *